Dec. 11, 1923.

P. DONZERO

ANTITHEFT LOCK

Filed Feb. 12, 1923

Peter Donzero
INVENTOR

BY Victor J. Evans
ATTORNEY

WITNESS:
H. A. LaClair
H. Cullison

Dec. 11, 1923.
P. DONZERO
ANTITHEFT LOCK
Filed Feb. 12, 1923
1,477,432
2 Sheets-Sheet 2
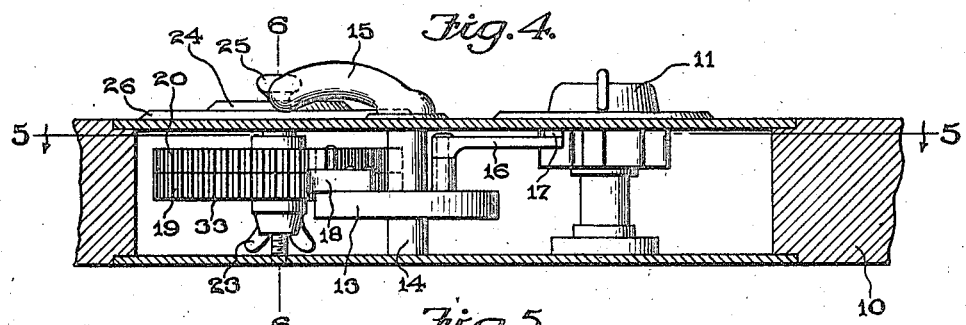
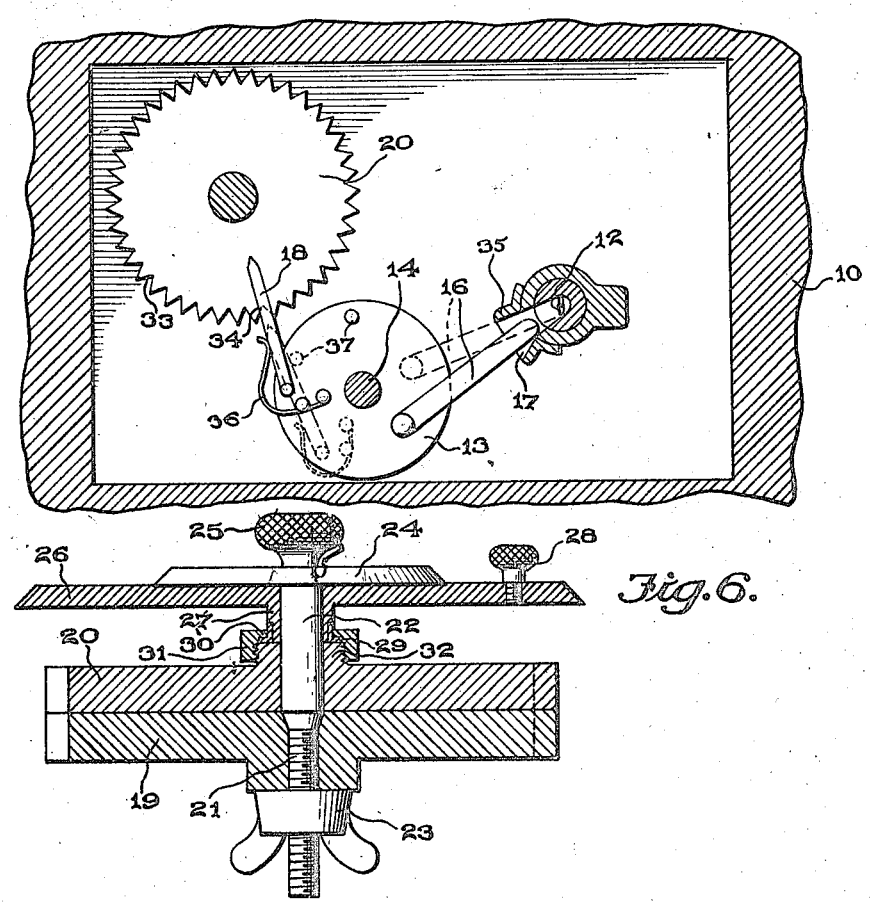
Peter Donzero
INVENTOR
WITNESS:
ATTORNEY Patented Dec. 11, 1923.

1,477,432

UNITED STATES PATENT OFFICE.

PETER DONZERO, OF CLINTON, INDIANA.

ANTITHEFT LOCK.

Application filed February 12, 1923. Serial No. 618,530.

*To all whom it may concern:*

Be it known that I, PETER DONZERO, a citizen of the United States, residing at Clinton, in the county of Vermilion and State of Indiana, have invented new and useful Improvements in Antitheft Locks, of which the following is a specification.

This invention contemplates an effective means for preventing the theft of motor operated vehicles, which means being designed to prevent the insertion of the switch key, so as to render it impossible to operate the switch.

More specifically stated, the invention is in the nature of a combination lock mounted upon the dash board of the vehicle, and operable to control a movable element, which when in active position traverses the key hole slot, the construction being such that the combination can be varied from time to time, so that no one can operate the mechanism other than the owner of the vehicle having a knowledge of the combination.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 4 is a transverse sectional view through the instrument board showing the parts in the position illustrated in Figure 2.

Figure 5 is a similar view showing the parts disposed in the manner illustrated in Figure 3.

Figure 6 is a sectional view taken on the line 6—6 of Figure 4.

Figure 1:
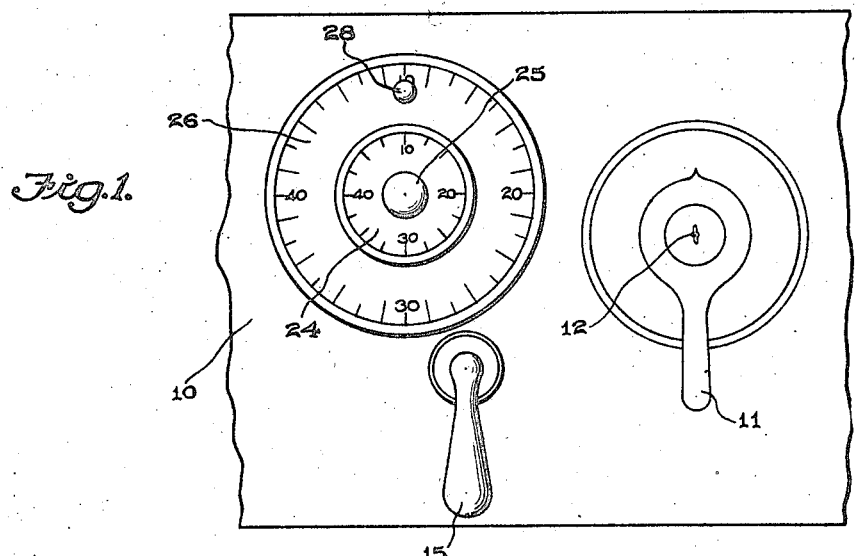
Figure 1 is a fragmentary view of the instrument board showing the arrangement of the parts thereon.
Figure 2:
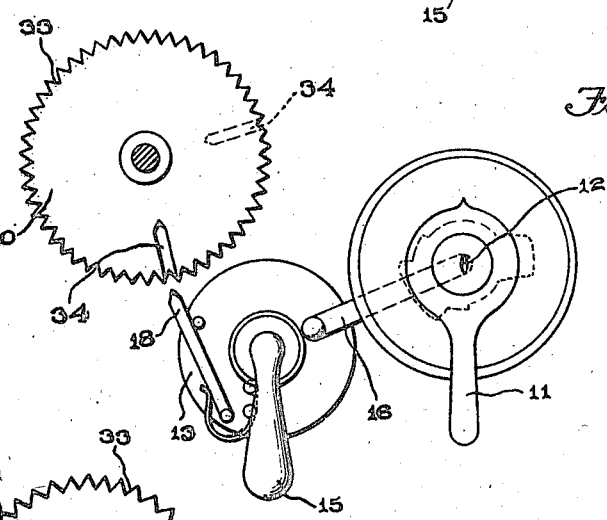
Figure 2 is a view in elevation showing the mechanism and the arrangement of the parts when the key hole slot is obstructed.
Figure 3:
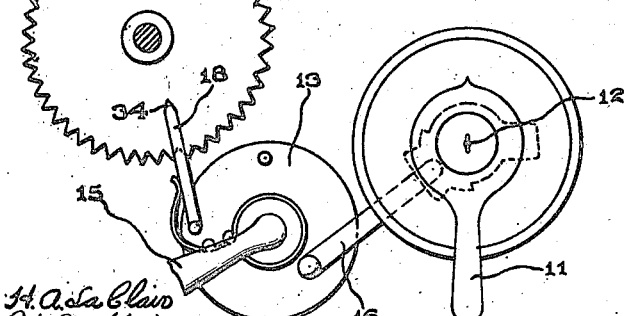
Figure 3 is a similar view showing the normal position of the parts.

Referring to the drawings in detail, 10 indicates a portion of the instrument board embodied in motor vehicle constructions, and mounted upon the board is the usual switch element 11 adapted to control the ignition, and adapted to be locked against movement in a neutral position by means of a key controlled mechanism, not shown and not forming any part of this invention. The switch element is however, provided with a key hole slot 12 to accommodate the usual switch key. It is for the purpose of traversing this slot 12 with a view to preventing a key or any other instrument from being inserted within the slot by unauthorized persons that I provide the mechanism forming the subject matter of this invention. The mechanism is disposed in a suitable casing arranged behind the instrument board, but controlled from the opposite side of the instrument board as illustrated.

This mechanism includes a disk 13 mounted for rotation on a shaft 14, the latter being equipped with a handle 15 arranged at one side of the instrument board 10 and in convenient reach of the operator of the vehicle. Pivotally associated with this disk 13 is a locking element 16 of elongated configuration and which element is utilized to traverse the key hole slot 12 for the purpose mentioned when in active position. For this purpose the element 16 is pivoted at one side of the disk adjacent the periphery thereof, and adapted to radiate from the disk when it is received within the slot 17 in the switch element, in which position it traverses the key hole slot 12, thereby obstructing this slot to prevent the insertion of a key or any other instrument within the slot 12, by unauthorized persons attempting to steal the vehicle. Pivoted upon the same side of the disk 13 at a point diametrically opposite the pivotal connection between said disk and the element 16, is a pin 18, the latter cooperating with a plurality of rotatable disks in a manner to be presently described, in order to allow the locking element 16 to be moved away from the switch element when it is desired to use the vehicle.

The disks just referred to are arranged one in advance of the other, being preferably in face to face contact, and indicated at 19 and 20 respectively. The periphery of each disk is toothed or serrated to render it more difficult for any one to operate the mechanism without knowledge of the combination. The disk 19 is supported upon the reduced extremity 21 of a shaft 22, which extremity is threaded to accommodate a winged nut 23, which when tightened supports the disk 19 in relation to the shaft 22, so that these parts are rotated in unison. The shaft projects through the instrument board 10 and is equipped with a graduated plate 24 and a knob 25. The plate 24 is disposed in face to face contact with a similar graduated plate 26, the latter being considerably greater in diameter than the plate 24, so that the graduations on both plates can be readily read and arranged in a particular manner for different combinations.

The plate 26 is arranged at one end of a sleeve like member 27 which is supported upon the shaft 22, but rotatable independently of the latter by means of a knob 28. This sleeve is provided with an annular flange 29, which is engaged by an inwardly directed flange 30 forming part of a coupling nut 31, the latter being interiorly threaded for threaded association with the tubular portion 32 of the disk 20. The tubular portion 32 obviously is supported upon the shaft 22, but is rotated independently thereof, and simultaneously with the plate 26. As above stated, the disks 19 and 20 are closely associated, so that the combined thicknesses of these disks present a broad peripheral surface, which is toothed or serrated as at 33 to the pin 18, so that should the handle 15 of the shaft 14 be slightly moved toward the left, while the locking element 16 was in active position, the pin 16 would engage the toothed surfaces 33 of the associated disks, which would obviously prevent any further movement of the shaft 14. Consequently, the locking element 16 cannot be moved away from its active position, unless the party was familiar with the combination, so that the disks 19 and 20 can be properly arranged to receive the pin 18, and thereby allow the shaft 14 to be rotated a proper degree in order to move the element 16 to its inactive position. For this purpose each disk 18 and 20 is provided with a radially disposed slot 34, and it is quite obvious, that it is necessary to bring both of these slots into alignment to receive the pin 18 before the element 16 can be moved to an inactive position. Consequently, it is ncessary to know the combination, or in other words, know just how far to move each of the plates 24 and 26 in one or the other direction to cause the slots 34 to coincide.

This construction provides a very effective means for preventing the theft of motor operated vehicles, in that the switch cannot be operated by anyone other than the owner of the vehicle or one who knows the combination of the mechanism above described.

For the purpose of holding the locking element 16 in proper relation to the key hole slot 12, so that the locking element will intersect this slot at the proper interval incident to the partial rotation of the disk 13, I provide a guide 35 which normally supports the adjacent end of the pin 16 as shown by full lines in Figure 5. This guide is provided with a flared opening or passage which communicates with the slot 12, and consequently the pin is guided into the slot at the proper time.

The disk 13 is provided with a curved spring 36, one end of which is secured to the disk, while the free end of this spring bears against the pin 18, holding the latter normally in contact with a stop lug 37 carried by the disk. By reason of this construction, the pin is held in proper position, both with relation to the disk 13 and the slot 34 of the disk 20, so that as the disk 13 is rotated in one direction, the pin 18 is guided into the slot 34.

While it is believed that from the foregoing description, the nature and advantages of the invention will be readily apparent, I desire to have it understood that I do not limit myself to what is herein shown and described and that such changes may be resorted to when desired as fall within the scope of what is claimed.

Having thus described the invention, I claim:

1. The combination with a rotatable element having a key hole slot, means for obstructing said slot, said means including a disk mounted for rotation, an element pivoted on said disk and adapted to be positioned to traverse said key hole slot incident to the rotation of the disk in one direction, and means for preventing rotation of the disk in an opposite direction, susceptible of adjustment to permit said element to be moved to an inactive position.

2. The combination with a rotatable element having a key hole slot, of a rotatable disk, an element projecting from said disk and adapted to be arranged to traverse said slot incident to the rotation of the disk in one direction, a pin carried by said disk, and a combination lock mechanism arranged adjacent said disk and cooperating with said pin to control the movement of said element to its inactive position.

3. The combination with a rotatable switch element having a key hole slot, of means for preventing the insertion of a key within said slot, said means including a rotatable disk, an element projecting from said disk and adapted to be arranged to traverse said slot when the disk is rotated in one direction, a pin pivoted on said disk, and a combination lock mechanism disposed adjacent the disk for controlling the return of said element to its inactive position, said mechanism including a pair of serrated disks mounted for independent rotation, each of said latter mentioned disks having a radially disposed slot adapted to be arranged in staggered relation when the locking element is in active position, and means for rotating the latter mentioned disks to cause said slots to coincide for the reception of said pin, whereby the first mentioned disk can be rotated in an opposite direction for the purpose specified.

In testimony whereof I affix my signature.

PETER DONZERO.